United States Patent [19]
Epley

[11] Patent Number: 5,251,255
[45] Date of Patent: Oct. 5, 1993

[54] PROCESSING INTERACTIONS AMONG TELECOMMUNICATIONS CALL FEATURES

[75] Inventor: Robert V. Epley, Aurora, Ill.

[73] Assignee: AT&T Bell Laboratories, Murray Hill, N.J.

[21] Appl. No.: 686,647

[22] Filed: Apr. 17, 1991

[51] Int. Cl.[5] .................. H04M 3/00; H04M 3/42; H04M 7/00
[52] U.S. Cl. .................. 379/242; 379/207; 379/230; 379/245; 379/247; 379/265; 379/266
[58] Field of Search ............ 379/242, 265, 266, 207, 379/201, 245, 247, 230, 142

[56] References Cited

U.S. PATENT DOCUMENTS

| | | | |
|---|---|---|---|
| 4,611,094 | 9/1986 | Asmuth et al. | 379/201 |
| 4,737,983 | 4/1988 | Frauenthal et al. | 379/113 |
| 4,757,267 | 7/1988 | Riskin | 379/113 |
| 4,788,718 | 11/1988 | McNabb et al. | 379/115 |
| 5,062,103 | 10/1991 | Davidson et al. | 379/265 |

FOREIGN PATENT DOCUMENTS 0278155  11/1989  Japan .................. 379/242

OTHER PUBLICATIONS

Call Model Recommendation 1G.3-003 Version 4.0, Dec. 29, 1989, published in Bellcore SR-TSY-006129, Issue 1, Mar. 1990.
Feature Interaction Management Question by Lee Moffitt, Jun. 20, 1990 from Bellcore Multi-Vendor Interactions forum meeting.
Advanced Intelligent Network (AIN) Release 1 Network and Operations Plan, Bellcore Special Report SR-NPL-001623, Issue 1, Jun. 1990.
Rapid Service Delivery VO Feature Manager Functional Specification, AT-RSD-1445-11-014-01, Feb. 28, 1991, prepared by U S West Advanced Technologies, Inc.

*Primary Examiner*—James L. Dwyer
*Assistant Examiner*—Fan Tsang
*Attorney, Agent, or Firm*—Werner Ulrich

[57] ABSTRACT

This invention relates to arrangements for controlling processing of telephone calls from feature processors. Feature processors are data bases, usually shared among a plurality of switching systems, and usually comprising data for customers served by these switching systems, for altering the processing of telephone calls from and to these customers in accordance with that data. In order to perform this modification, data messages are exchanged between the switching systems and the feature processor. In a departure from the prior art, these data messages include functional indicators, i.e., indicators of basic characteristics of a call, each of which may be associated with many features and which may influence the execution of other features, wherein the execution of at least some of the features of the two groups can be influenced by the feature processor. Advantageously, the use of functional indicators helps to reduce the amount of data to be transmitted between the switching systems and feature processor.

13 Claims, 4 Drawing Sheets

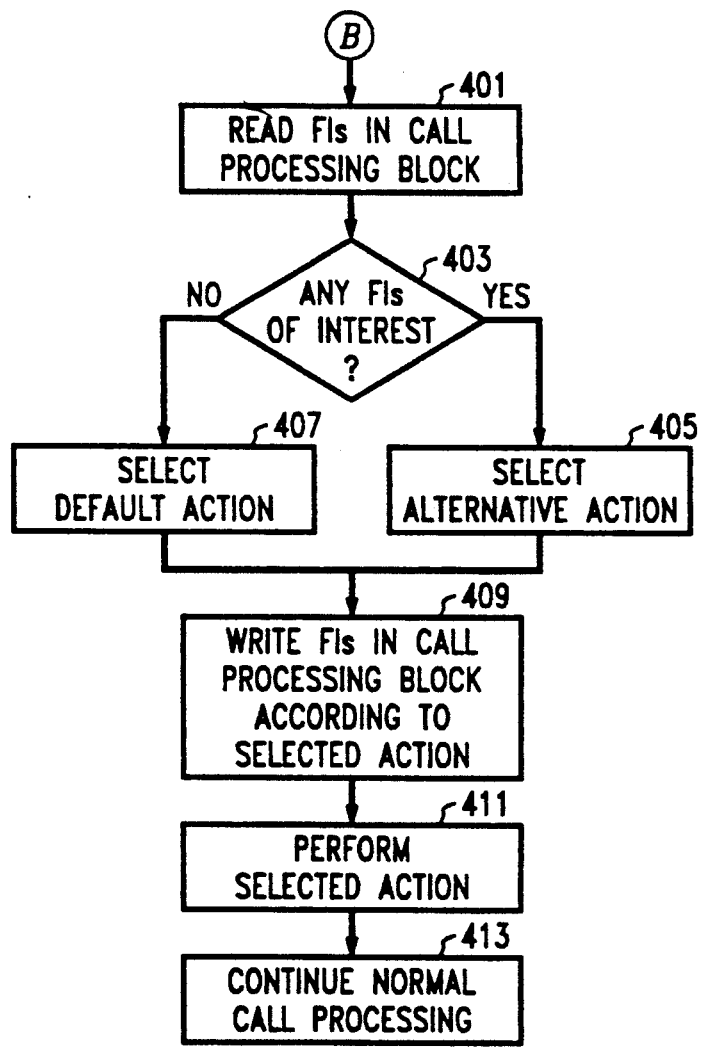

PROCESSING INTERACTIONS AMONG TELECOMMUNICATIONS CALL FEATURES

TECHNICAL FIELD

This invention relates to control of telecommunication features from a remote feature processor data base.

PROBLEM

Modern telecommunications systems offer to their customers a wide variety of features. A telecommunication switch of such a system comprises a stored program for controlling switch operations and implementing features, and a data base which, among other functions, defines the active features for each customer connected to the switch. These features include customer services such as conference, call waiting, call forwarding, and call forwarding on busy.

In recent years, remote data bases have been added for enhancing the capabilities of a telecommunication switch. For example, a data base is used for routing 800 (free phone) calls by providing a destination, a conventional or plain old telephone service (POTS) telephone number that corresponds to each dialed 800 number for a particular region. Such data bases have provided great flexibility for routing telephone traffic in accordance with the needs of private business networks or special types of calls.

The combination of the switches, the data bases for modifying routing and the signaling network interconnecting these data bases is called an intelligent network.

More recently, a need has been found for telephone operating companies to find means for customizing the use of the features and capabilities that are available in their switches through the use of a specialized data base and its associated processor. A feature is a service to which a customer may subscribe. An example is the call waiting service whereby a customer can arrange to get a signal if an incoming call comes while the customer is on another call and the customer can arrange to switch to the waiting call. Such a data base, called a remote feature processor (RFP), may be a switching control point (SCP) or adjunct. (The adjunct uses a higher speed data link to communicate with the switch, thereby making it possible to exchange more data between the switch and the adjunct).

The combination of the switches and the SCP or adjunct plus the signaling network that interconnects the two is called an advanced intelligent network.

More advanced intelligent networks are capable not only of modifying or specifying routing of calls performing calling card checks, etc., but also for customizing the use of telephone features, making available new features through appropriate use of the atomic feature set of the switch. Therefore, in order to implement an advanced intelligent network, it is necessary to provide an interface for specifying the atomic capability set elements to be invoked in a particular call at the interface to the switch and at the interface to the RFP, to provide a description of the atomic capability set currently active for a particular customer and the character of the stimulus such as an incoming call for which a response is to be generated. The features in the switch are implemented through the use of a set of feature primitives or primitives. The remote feature processor has its own data base for storing information about remote features of customers and switch feature information.

A requirement of a more advanced intelligent network is that it must allow for the proper interworking of remote and switch features. In order to meet this requirement, using presently contemplated solutions, the amount of interface bandwidth required to transmit feature information between the remote feature processor and the switch is high; as new switch features are introduced, they must be introduced using a standard communication protocol between the remote feature processor and the switch and must be programmed simultaneously into the remote feature processors as well as the switches; the remote feature processor must store and process a great deal of switch feature information in order to accomplish its task; and the remote feature processor must store a great deal of switch feature information for each customer connected to the switch.

A problem with this arrangement is that the processing which must be carried out by the remote feature processor must take into a account the characteristics both of the switch feature set and the remote feature processor feature set in order to carry out its work. This requires the remote feature processor be constantly updated as new features are added to the switch and requires a complex analysis program to account for all the interactions of features of the remote feature processor and features of the switch processor.

Another problem of the advanced intelligent network is that the switches of different vendors must all interact with a common feature processor. As a result, it is necessary to have a coordinated data interface describing each feature in a common language so that the feature information received by the remote feature processor and transmitted from the remote feature processor is the same for the switches of all different manufacturers.

SOLUTION

In accordance with the principles of this invention, an advance is made over the prior art and the above problems are substantially alleviated by transmitting functional indicators from the switch to the remote feature processor. A functional indicator is an indicator of a basic characteristic of a call which may be associated with a plurality of features, and which may influence execution of other features, wherein the execution of at least some of the features in the two groups can be influenced by the RFP. Execution of a switch based feature that causes that characteristic to occur sets the functional indicator. Then, RFP based features that might be affected by the characteristic read the functional indicator to determine the execution of the RFP based feature.

In accordance with one aspect of the invention, execution of an RFP based feature that causes a characteristic to occur, sets a functional indicator The RFP transmits that functional indicator to the switch. The execution of switch based features can then be modified by functional indicators received from the RFP.

Advantageously, these arrangements allow switch and RFP programs to interpret remote commands more readily and substantially reduce the bandwidth required for messages between the remote feature processor and the switch.

An example of a functional indicator is a "do not disturb" indicator which may be set, for example, by features such as cancel call waiting (do not give a call waiting signal because the customer does not wish to have the call interrupted), data security (do not interrupt the call because a data call may be mutilated through the signal for call waiting) and a "do not disturb" feature (the customer does not wish to be disturbed with calls for a certain period).

Other examples of functional indicators are:

1. A multiway controller indicator; this indicator is used to identify the controlling station on conference calls. Many different types of conference features are associated with this functional indicator which is used to identify the controlling customer station for any type of conference call.

2. A facsimile call indicator can be used, for example, to automatically forward facsimile calls from a nonfacsimile terminal to a facsimile terminal for accepting facsimile calls for the nominal terminating number.

3. An emergency service indicator can be used, for example, to insure that all emergency calls are retained, even in the presence of features that would otherwise try to reconfigure or redirect a call.

4. A priority service indicator can be used to trigger a special alerting (ringing) signal, provide barge-in privileges, or modify terminating treatment such as automatic forwarding or the cancellation of forwarding (so that, for example, for a boss/secretary group, the boss would be automatically accessed by the priority call).

5. An operator assistance call indicator; this can be used to instruct features other than operator assistance call features to ignore a switchhook "flash" and thus not interfere with whatever operator feature is active.

Functional indicators allow switch and remote features to have enough knowledge of each other's operation so that they can interact in appropriate ways. Defining only needed functional indicators that can be shared by multiple features saves switch-RFP bandwidth and results in less switch information for the RFP to process than is the case with a feature-specific solution. Sharing of functional indicators by multiple features allows new switch features to be introduced without changing RFP software or the switch-RFP interface (and thus, the software of other switch vendors). In general, it results in a more stable switch-RFP interface and thus, in fewer multi-vendor coordinated software changes than with a feature-specific solution.

BRIEF DESCRIPTION OF THE DRAWING

FIGS. 2-4 are flow diagrams of actions performed by an RFP and a switch.

DETAILED DESCRIPTION

Figure 1:
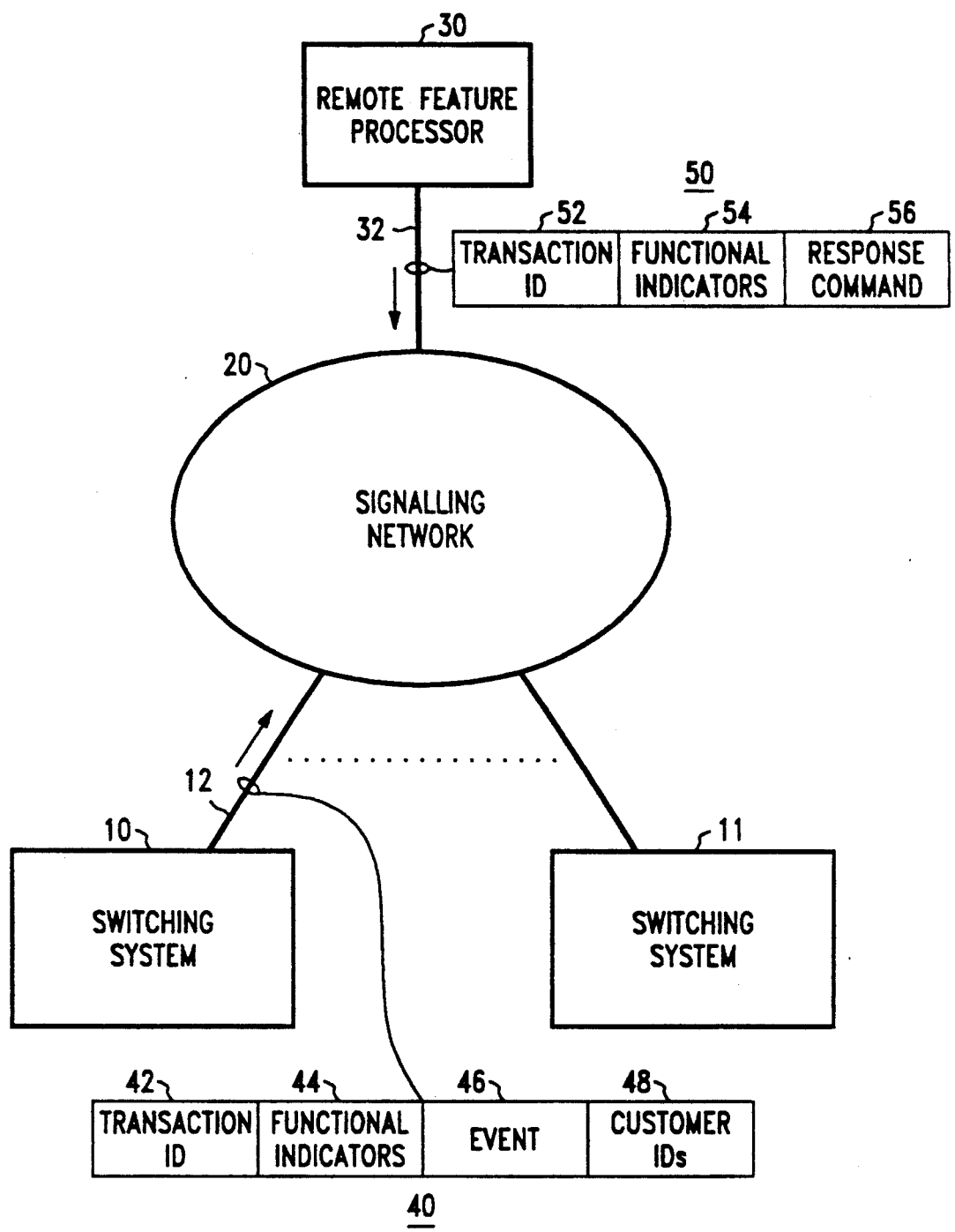
FIG. 1 is an overall block diagram of the operation of the invention.

FIG. 1 is a block diagram of an exemplary embodiment of applicant's invention. A plurality of switching systems 10, . . . , 11 are connected to a signaling network 20 for accessing a remote feature processor 30. Each of the switching systems and the remote feature processor comprise a program controlled processor and a data base for storing data, such as feature data, related to individual customers. The switching systems are, for example, local end offices such as the 5ESS ® switching system described in *AT&T Technical Journal*, Vol. 64, No. 6, Part 2, July/August 1985, pp. 1305-1564. The signaling network in this exemplary embodiment is a network for transmitting signaling messages using the CCS7 protocol of the American National Standards Institute (ANSI). The signaling network includes signal transfer points for switching messages transmitted within the signaling network. It is the function of the remote feature processor to process event messages transmitted from a switching system, such as switching system 10, and to reply with event response messages. Responsive to the event response messages, the switching system may alter subsequent processing of a call if the functional indicators received are different from the functional indicators transmitted.

Switching system 10 transmits an event message 40 comprising a transaction identifier 42 to allow the event and event response messages to be correlated, a group of functional indicators (segment 44), a description of the event for which a response is requested (segment 46), and the identifications of the customers associated with that event (segment 48). This message 40 is transmitted from switching system 10 over data link 12 to the signaling network 20, thence over data link 32 to remote feature processor 30. Remote feature processor 30 receives message 40, examines the functional indicators therein, consults its own data base and its own event processing programs and prepares and transmits an event response message 50. This event response message is transmitted from remote feature processor 30 over data link 32 to signaling network 20, thence to data link 12 and switching system 10. The event response message 50 comprises a transaction identifier (segment 52) which, if the response message is in response to message 40 is identical to the original transaction identifier of segment 42, a group of functional indicators (segment 54) prepared in response to the event message in consideration of the program of the remote feature processor 30 for processing event messages including functional indicators and in view of data concerning the customer stored in the data base of the remote feature processor, and segment 56 which specifies the response command to switching system 10.

Figure 2:
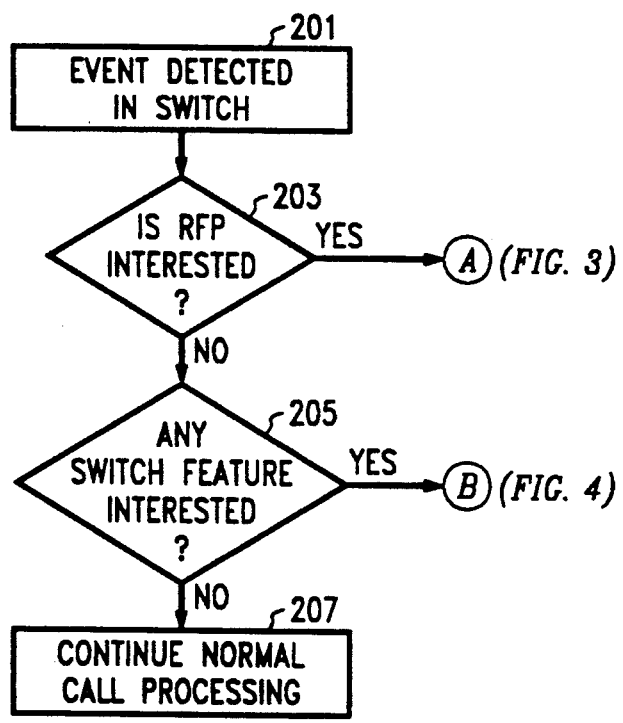

FIG. 2 is a high level flow chart of the call processing that takes place in the switch. Block 201 indicates that a detectable event is detected in the switch. This event may be something which is actually detected using the peripheral equipment of the switch or it may be a message received from another switch. Test 203 checks whether the remote feature processor is interested in this type of event. If so, then the blocks of FIG. 3, starting with block 301 are executed. If not, test 205 determines whether any switch feature is interested in the detected event. If a switch feature is interested in the event, then the blocks shown on FIG. 4, starting with block 401 are executed. If not, then normal call processing is continued (action block 207).

Figure 3:
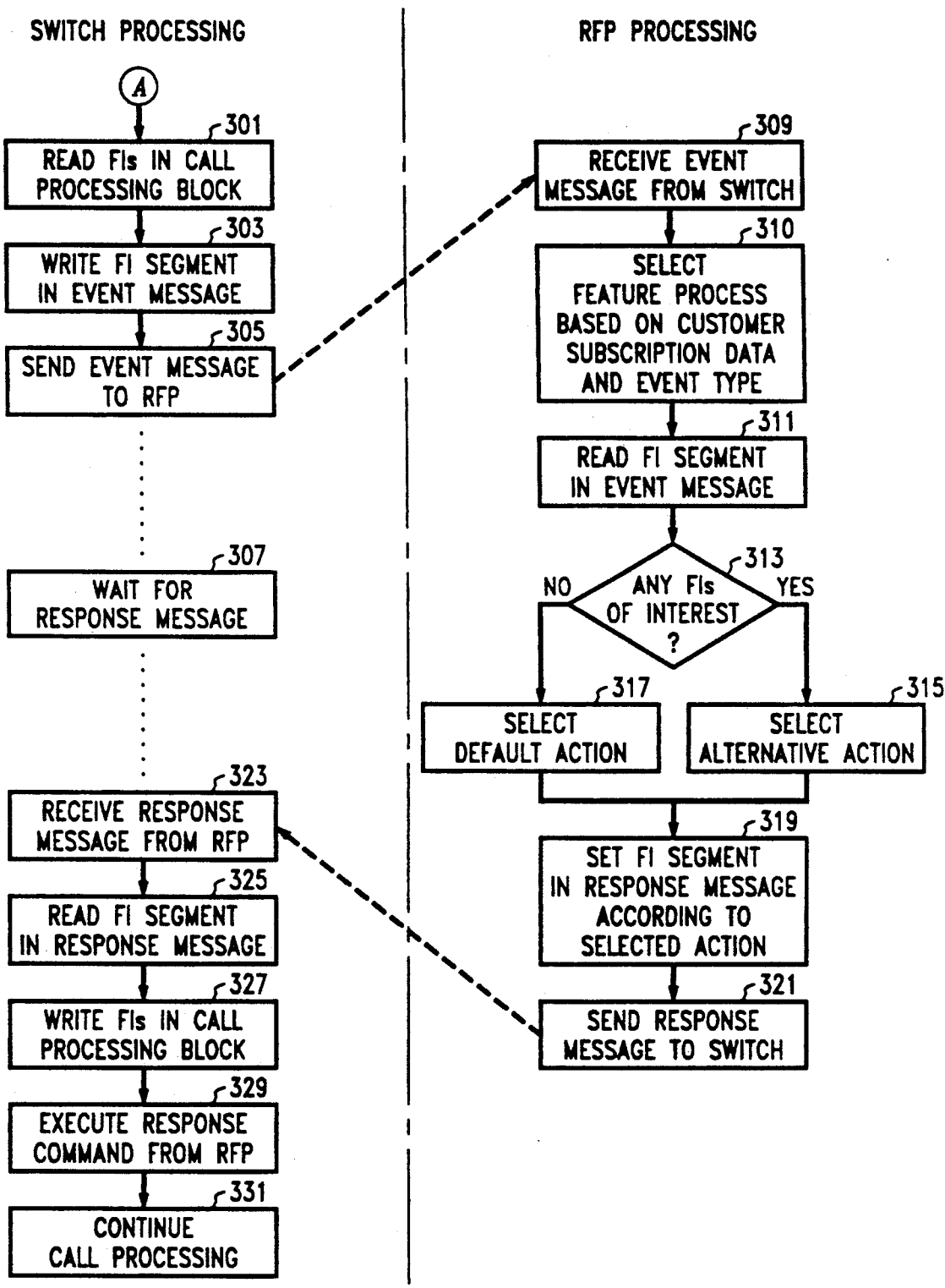

FIG. 3 describes the actions performed in response to the detection of an event which is of interest to a remote feature processor. The functional indicators in the call processing block are read (action block 301) and an event message is generated including the functional indicator segment (action block 303). This event message is then sent to the remote feature processor 305. In the meantime, while the remote feature processor acts on this message, the switch is in the state whereby it waits for the response message (action block 307). The remote feature processor receives the event message from the switch (action block 309) and reads the functional indicator segment in the event message (action block 311). Test 313 then determines whether there are any functional indicators of interest. If so, an alternative action is selected (action block 315) so that the actions performed are not the same as the default actions (action block 317). When the appropriate action has been selected, the functional indicator segment is prepared for the response message according to the alternative or default action, whichever was selected (action block 319) and the response message containing a response command and the functional indicator segment is sent back to the switch (action block 321). The switch receives the response message from the remote feature processor (action block 323) reads the functional indicator segment in the response message (action block 325) and responsive to the reading of this segment, writes the appropriate functional indicators in the call processing block (action block 327). The response command received from the RFP is then executed (action block 329) and normal call processing is continued (action block 331). Note that any functional indicator set by the RFP can influence the execution of any subsequent switch or RFP feature.

If the RFP was not interested in the event, but a switch feature was interested in the event, the programs shown in FIG. 4 are executed. First, the functional indicators in the call processing block are read (action block 401) and are tested to see if there are any functional indicators of interest (test 403). If so, then an alternative action for responding to the event is selected in accordance with the functional indicators (action block 405). If there are no functional indicators of interest, as determined in test 403, then a default action is selected (action block 407). Functional indicators are written in the call processing block according to the selected action (action block 409), and then that action is executed (action block 411). Subsequently, normal call processing is continued (action block 413).

A specific example will help illustrate the operation of the invention. In this specific example, a new feature is implemented using the remote feature processor. The new feature is one wherein a customer who dials a priority code is given call waiting treatment when the call is completed to another customer who accepts call waiting type calls only for priority calls and not for normal calls. As is known, call waiting treatment of a call allows a special call waiting signal to be delivered to the called customer when the called customer is busy on another call and the called customer can switch back and forth between the two calls by briefly depressing the switchhook of the called customer's telephone. This treatment is normally provided to all incoming calls. However, for this special service, it is provided only to priority incoming calls.

In this particular implementation of the feature, the caller first dials a priority calling code, then receives second dial tone and dials the number of the terminating customer. First, the switch based priority calling feature will be discussed. This feature is used to set a priority calling functional indicator in response to the reception of the priority code. First, the event that activates the switch based priority calling feature is the detection by a digit analysis process that the priority code has been dialed. This event is detected in the switch (action block 201), the test 203 of whether the RFP is interested yields a negative result since this is a switch based feature, but the test 205 of whether any switch feature is interested yields a positive result. The feature indicators in the call processing block are read, and test 403 checks whether there are any functional indicators of interest. In this case, because no features have been previously active for this call, none are set, and therefore the default action 407 is selected and the functional indicator for priority call is set (action block 409). The planned actions for detecting a priority call are then performed (action block 411) and normal call processing is continued (action block 413).

Subsequently, the caller dials the number of the called customer who is busy on another call. Because this is a priority call and the called customer has the RFP based call waiting for priority calls feature, this call will be given call waiting treatment. This is performed as follows: In the switch, following the detection of completion of dialing and the subsequent attempt to route the call to the called customer, the switch detects a busy event (action block 201) and detects that a busy event check of the RFP is required for this customer (positive result of test 203). The switch will therefore read the functional indicators in the call block (action block 301) which in this case will include the priority indicator. The switch then writes the functional indicator segment in the event message (action block 303) and sends the event message to the RFP (action block 305). The switch then waits for the response message (action block 307) while performing work on other calls. In the meantime, the RFP receives the event message from the switch (action block 309) and based on the customer subscription data and event type, selects the feature process for processing this message (action block 310). The RFP then reads the functional indicator segment of the event message (action block 311) and tests whether there are any functional indicators of interest (test 313). The default action associated with action block 317, in this case would be to apply busy tone to the incoming call. However, when the RFP feature process reads the functional indicators (action block 311), it finds a functional indicator of interest, namely the priority indicator in test 313 and selects an alternative action (action block 315). The alternative action is to formulate a response message that directs the switch to apply call waiting tone to the called customer (action block 315). The call waiting for priority calls feature does not affect any of the functional indicator call characteristics so that no further functional indicators need be set in the functional indicator segment of the response action (action block 319). The RFP then sends the response message to the switch including a response command asking the switch to give call waiting treatment to this call (action block 321). This message is received in the switch (action block 323). The switch reads the functional indicator segment in the response message (action block 325) and responsive to seeing no additional functional indicators set or reset, does not change any of the functional indicators in the call block (action block 327). The switch then executes the response command from the RFP by giving this call the call waiting treatment and continues call processing (action block 331).

To further illustrate the flexibility of this approach, consider an additional call waiting feature whereby only calls which dial a preselected password can be given call waiting treatment. In this case, after the completion of dialing and the detection of busy, a condition would be found for the called customer indicating that the RFP is to be consulted. In response, the RFP would send a message with the command to give the calling customer an announcement and accept a two, three or four digit password. After a password has been received, the RFP is again queried, and in response to detecting that the correct password had been entered, the RFP would return a message with a response command to give this call the call waiting treatment, and the priority call functional indicator set. This functional indicator might influence later processing of the call.

Examples of functional indicators, in addition to those discussed in the solution statement, are the following:

1. Test call: a test call is given special treatment; for example, such a call should not be forwarded.
2. Redirected call: a call which has been forwarded or transferred from an original destination.
3. Reverse charge call: billing for such a call should be to the called party.
4. Intra-group call: a call within a business group, which can span multiple switches.
5. Inter-LATA call: a call between different Local Access and Transport Areas (LATAs).
6. International call: a call between different countries.
7. Flash: a call on which some feature is monitoring for a flash signal.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer indentification data for said call; wherein said remote feature processor comprises data for customers identified by said customer identification data; and wherein said remote feature processor further modifies the processing of said request message by using said data stored for customers identified by said customer identification data;

wherein one of said functional indicators is a do not disturb indicator.

2. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to recipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is a multiway controller indicator.

3. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is a facsimile call indicator.

4. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is an emergency service indicator.

5. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is a priority service indicator.

6. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is an operator assistance call indicator.

7. A method of processing a call comprising the steps of:

responsive to receipt of data for said call in a switching system, transmitting a request message to a remote feature processor system, the remote feature processor for serving a plurality of switching system, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is a test call indicator.

8. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is a redirected call indicator.

9. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is a reverse charge indicator.

10. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is an intragroup call indicator.

11. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data wherein one of said functional indicators is an indicator of a call between different Local Access and Transport Areas.

12. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is an international call indicator.

13. A method of processing a call, comprising the steps of:

responsive to receipt of data for said call in a switching system, transmitting a request message to a remote feature processor system, the remote feature processor for serving a plurality of switching systems, said request message comprising an event indication for a state of said call and indications of active ones of a plurality of functional indicators for said call;

responsive to receipt of said request message in said remote feature processor, processing said request message, using said event indication and using said indications of active ones of said plurality of functional indicators, to formulate and transmit a response message comprising an indication of a response command from said remote feature processor to said switching system; and responsive to receipt of said response message, executing said response command in said switching system;

wherein said request message further comprises customer identification data for said call; wherein said remote feature processor comprises data for customers identified by said customer identification data; and wherein said remote feature processor further modifies the processing of said request message by using said data stored for customers identified by said customer identification data;

wherein one of said functional indicators is a flash indicator.

* * * * *